(12) United States Patent
Baehr-Jones et al.

(10) Patent No.: US 12,045,080 B1
(45) Date of Patent: Jul. 23, 2024

(54) OPTICAL COMPUTING SYSTEM AND METHOD OF USE

(71) Applicant: Luminous Computing, Inc., Menlo Park, CA (US)

(72) Inventors: Thomas W. Baehr-Jones, Menlo Park, CA (US); Mitchell A. Nahmias, Menlo Park, CA (US)

(73) Assignee: Luminous Computing, Inc., Santa Clara, CA (US)

(*) Notice: Subject to any disclaimer, the term of this patent is extended or adjusted under 35 U.S.C. 154(b) by 828 days.

(21) Appl. No.: 17/170,794

(22) Filed: Feb. 8, 2021

Related U.S. Application Data

(60) Provisional application No. 63/082,218, filed on Sep. 23, 2020, provisional application No. 62/972,424, filed on Feb. 10, 2020, provisional application No. 62/971,626, filed on Feb. 7, 2020.

(51) Int. Cl.
*G06E 3/00* (2006.01)

(52) U.S. Cl.
CPC ............. *G06E 3/005* (2013.01); *G06E 3/006* (2013.01); *G06E 3/008* (2013.01)

(58) Field of Classification Search
CPC .......................... G06E 3/00–005; G06E 3/008
See application file for complete search history.

(56) References Cited

U.S. PATENT DOCUMENTS

| | | | |
|---|---|---|---|
| 6,417,965 B1 | 7/2002 | Ye et al. | |
| 7,113,705 B2 | 9/2006 | Carrick et al. | |
| 7,333,732 B2 | 2/2008 | Domagala | |
| 7,747,176 B2 | 6/2010 | Domagala | |
| 8,953,950 B2 | 2/2015 | Nazarathy et al. | |
| 9,176,361 B2 | 11/2015 | Sartor et al. | |
| 9,197,471 B1 | 11/2015 | Zanoni et al. | |
| 9,407,369 B2 | 8/2016 | Yu | |
| 9,496,964 B2 | 11/2016 | Sinsky et al. | |
| 10,009,135 B2 | 6/2018 | Tait et al. | |
| 10,454,580 B2 | 10/2019 | Gu et al. | |
| 10,763,974 B2 | 9/2020 | Bunandar et al. | |
| 11,836,466 B2 * | 12/2023 | Hein | G06N 3/0675 |
| 2005/0117916 A1 | 6/2005 | Kropp et al. | |
| 2007/0052498 A1 | 3/2007 | Pan et al. | |
| 2007/0212076 A1 | 9/2007 | Roberts et al. | |
| 2012/0197094 A1 | 8/2012 | Zhang et al. | |

(Continued)

OTHER PUBLICATIONS

Dubé-Demers, Raphaël et al. "Low-power DAC-less PAM-4 transmitter using a cascaded microring modulator" vol. 41, No. 22, Optics Letters / Nov. 15, 2016.

(Continued)

*Primary Examiner* — Matthew D Sandifer
(74) *Attorney, Agent, or Firm* — Stratford Group Ltd.

(57) ABSTRACT

An optical computation system, preferably including an optical source, a splitter, and one or more phase accumulator banks. A phase accumulator bank, preferably including two optical paths, a plurality of phase accumulator units, and a detector module, and optionally including one or more compensation phase shifters. A method, preferably including receiving one or more optical inputs, receiving one or more electrical inputs, controlling one or more phase accumulator units based on the electrical inputs, and generating one or more electrical outputs based on optical signals.

21 Claims, 15 Drawing Sheets

(56) References Cited

U.S. PATENT DOCUMENTS

| | | | |
|---|---|---|---|
| 2013/0251300 A1 | 9/2013 | Suzuki et al. | |
| 2015/0316794 A1 | 11/2015 | Hayakawa | |
| 2016/0139487 A1 | 5/2016 | Popovic et al. | |
| 2017/0176779 A1 | 6/2017 | Hauenschild et al. | |
| 2017/0222400 A1 | 8/2017 | Taylor | |
| 2018/0205465 A1 | 7/2018 | Tanaka et al. | |
| 2019/0331912 A1 | 10/2019 | Tait et al. | |
| 2019/0356394 A1* | 11/2019 | Bunandar | H04J 14/0279 |
| 2019/0370652 A1* | 12/2019 | Shen | G06N 3/045 |
| 2020/0142441 A1* | 5/2020 | Bunandar | G06E 1/045 |
| 2021/0336414 A1* | 10/2021 | Harris | G02F 3/00 |

OTHER PUBLICATIONS

Hai, Mohammed Shafiqul et al., "A Ring-Based 25 GB/s DAC-Less PAM-4 Modulator" IEEE Journal of Selected Topics in Quantum Electronics, vol. 22, No. 6, Nov./Dec. 2016.

Moazeni, Sajjad "A 40-GB/s PAM-4 Transmitter Based on a Ring Resonator Optical DACin 45-nm SOI CMOS" IEEE Journal of Solid-State Circuits, vol. 52, No. 12, Dec. 2017.

Nicholl, Gary "PAM-16 Implementation Update" IEEE 802.3 NG100GE Optics Study Group Minneapolis, May 2012.

Park, Anthony H.K. "Comparison of DAC-less PAM4 Modulation in Segmented Ring Resonator and Dual Cascaded Ring Resonator" Department of Electrical Engineering, 978-1-5090-5016-1/17/$31.00 @2017 IEEE, 2 pages.

Timurdogan, Erman "An ultralow power athermal silicon modulator" Nature Communications, DOI: 10.1038/ncomms5008, Received Dec. 6, 2013.

Khilo, Anatol, et al., "Photonic ADC: overcoming the bottleneck of electronic jitter", Feb. 13, 2012 / vol. 20, No. 4 / Optic Express.

Konishi, Tsuyoshi, et al., "Five-bit parallel operation of optical quantization and coding for photonics analog-to-digital conversion", Aug. 15, 2011 / vol. 19, No. 17 / Optics Express.

Shile, Wei, et al., "Multimode interference coupler based photonics analog-to-digital conversion scheme", Sep. 1, 2012 / vol. 37, No. 17 / Optics Letters.

Valley, George C., "Photonic analog-to-digital converters", Mar. 5, 2007 / vol. 15, No. 5 / Optics Express.

International Search Report and Written Opinion for application No. PCT/US21/22409 dated Jun. 2, 2021.

* cited by examiner

OPTICAL COMPUTING SYSTEM AND METHOD OF USE

CROSS-REFERENCE TO RELATED APPLICATIONS

This application claims the benefit of U.S. Provisional Application Ser. No. 62/971,626, filed on 7 Feb. 2020, U.S. Provisional Application Ser. No. 62/972,424, filed on 10 Feb. 2020, and U.S. Provisional Application Ser. No. 63/082,218, filed on 23 Sep. 2020, each of which is incorporated in its entirety by this reference.

TECHNICAL FIELD

This invention relates generally to the computing field, and more specifically to a new and useful optical computing system and method of use.

BACKGROUND

Typical computing systems require significant energy to perform electronic computations and/or propagate electrical signals. Thus, there is a need in the computing field to create a new and useful optical computing system and method of use.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
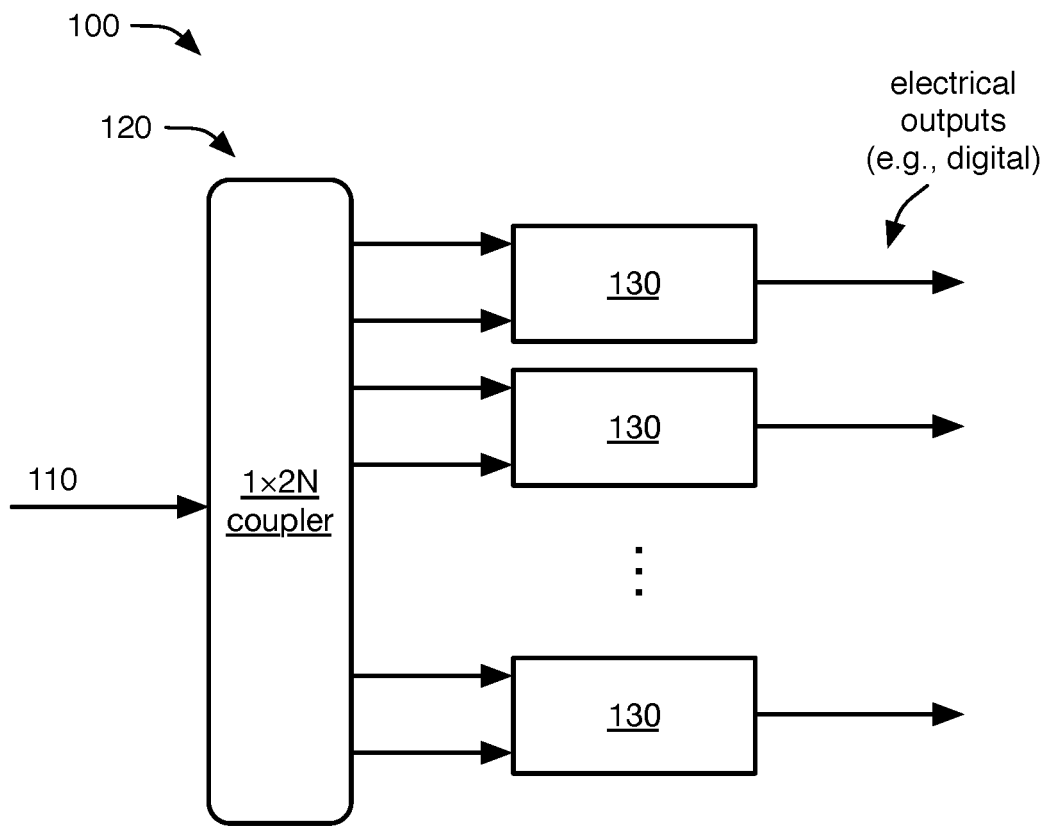
FIGS. 1A-1B are schematic representations of a first and second embodiment, respectively, of the system.
Figure 1B:
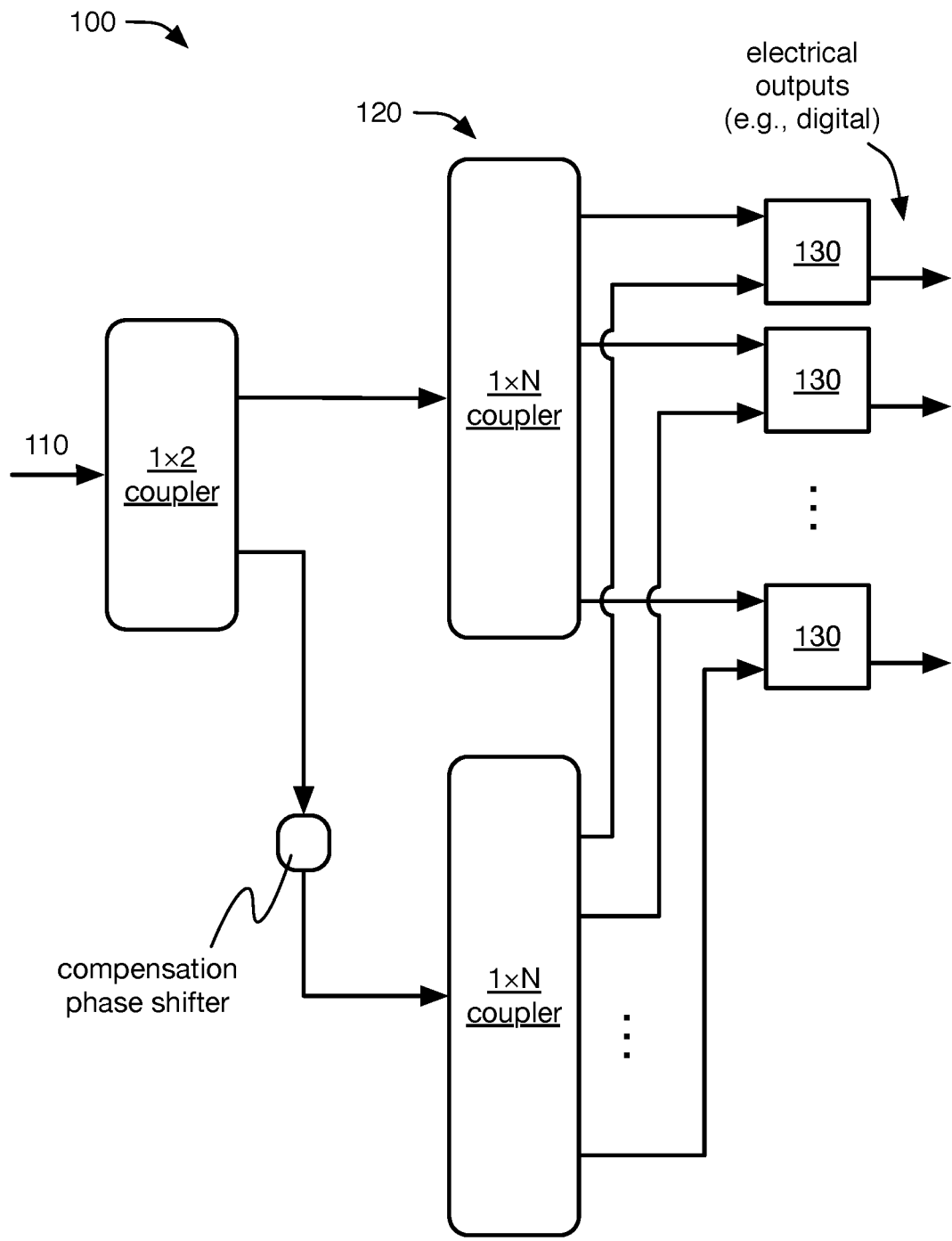
Figure 1C:
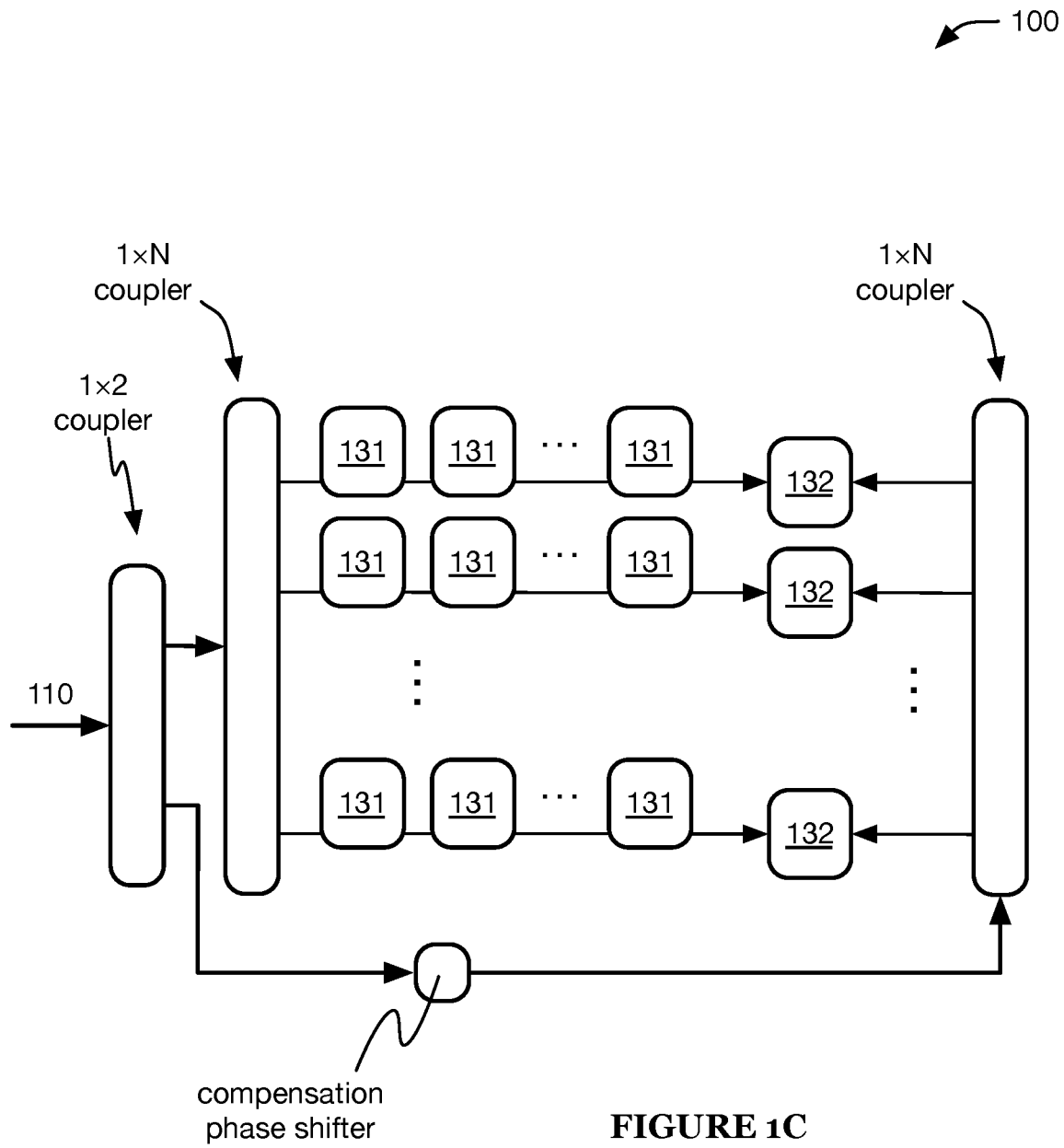
FIG. 1C is a schematic representation of an example of the second embodiment of the system.
Figure 2A:
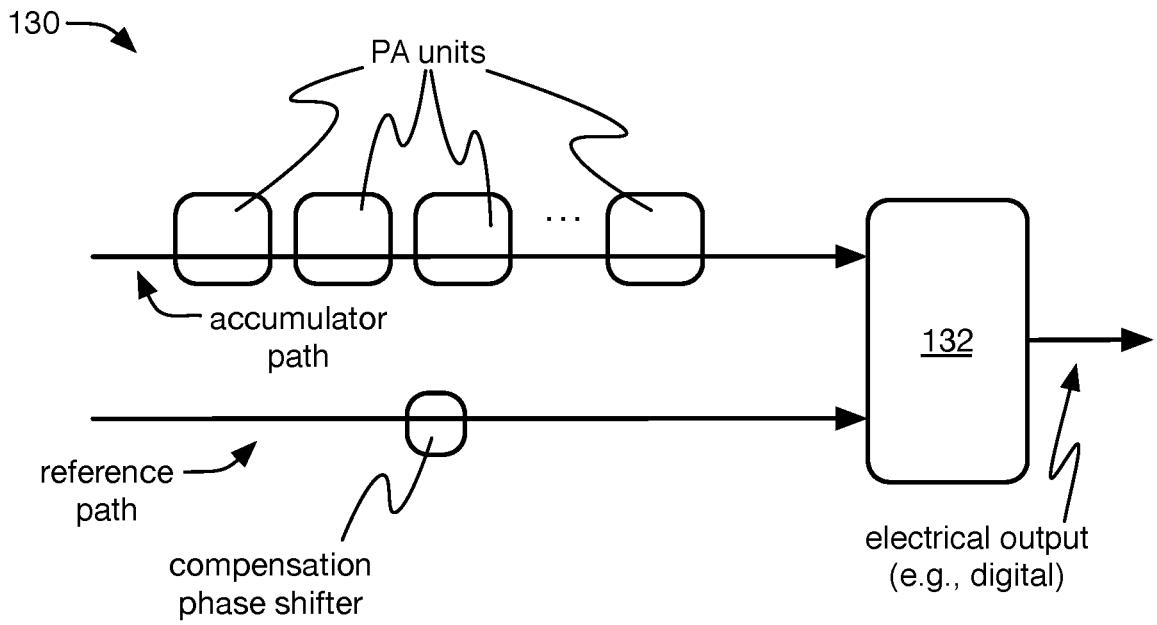
FIGS. 2A-2B are schematic representations of a first and second embodiment, respectively, of a phase accumulator bank.
Figure 2B:
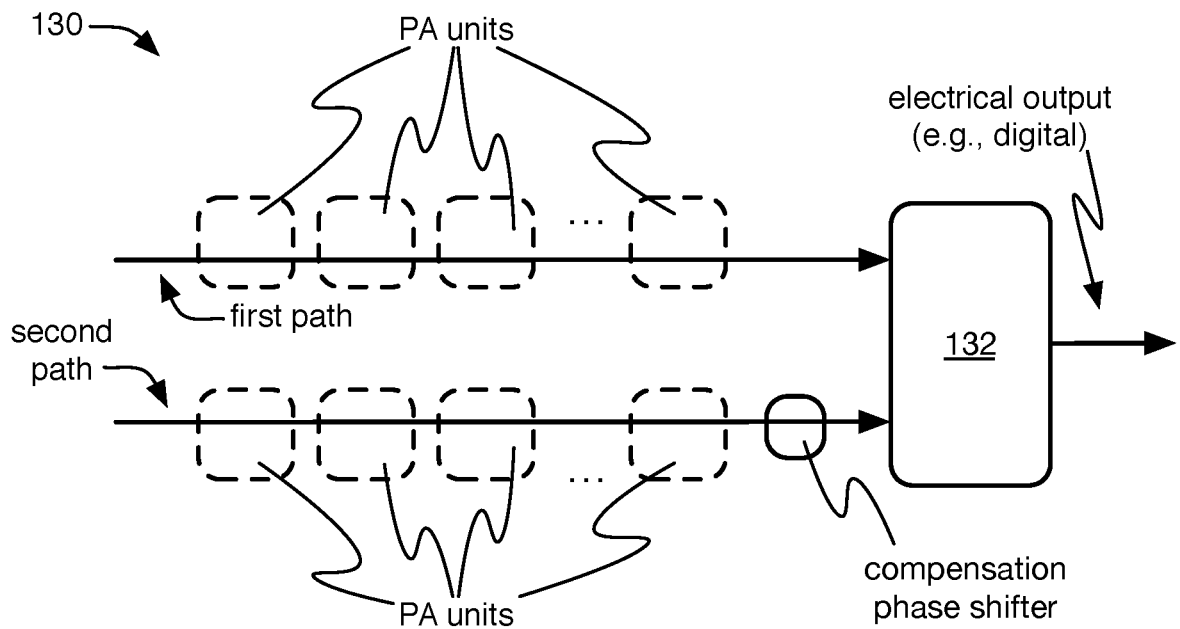

An optical computation system 100 preferably includes an optical source 110, a splitter 120, and one or more phase accumulator (PA) banks 130 (e.g., as shown in FIGS. 1A-1C). Each PA bank 130 preferably includes two optical paths, a plurality of PA units 131 and a detector module 132, and can optionally include one or more compensation phase shifters and/or any other suitable elements (e.g., as shown in FIGS. 2A-2B). A method 200 preferably includes performing one or more optical and/or optoelectronic computing operations, more preferably using the optical computation system 100 (e.g., using the system 100 such as described below in more detail). However, the system and/or method can additionally or alternatively include any other suitable elements.

2. System.

2.1 Optical Source.

The optical source 110 preferably provides a coherent light source (e.g., a single-channel source, such as a single laser line). The optical source is preferably substantially unmodulated (e.g., having substantially constant intensity and phase) but can alternatively have any suitable modulation. However, the optical source can alternatively include multiple channels and/or any other suitable light.

2.2 Splitter.

The splitter 120 preferably receives the optical source and splits it onto two or more optical paths. The splitter can include one or more splitter elements, such as two-way splitters (e.g., 1×2 couplers), star couplers, multi-mode interference (MMI) couplers, inverse designed couplers, and/or any other suitable elements.

For a system including multiple PA banks, the splitter preferably provides two optical paths to each PA bank (e.g., for a system including N PA banks, a total of 2N optical paths). In a first example, the splitter splits the optical source onto 2N branches (e.g., using a 1×2N coupler, such as shown by way of example in FIG. 1A; using a 1×N coupler, followed by a 1×2 coupler for each PA bank; etc.). In a second example, the splitter is a 1×(N+1) coupler (or analogously, a 1×2 coupler followed by a 1×N coupler on one of the outputs of the 1×2 coupler), wherein each of the N branches are provided to a different PA bank, and the additional branch is provided to a 1×N coupler that then provides each of its N branches to a different PA bank (e.g., as shown in FIGS. 1B-1C). However, the splitter can additionally or alternatively split the optical source into any other suitable number of branches using any suitable configuration of one or more optical couplers and/or other splitter elements.

Preferably, all output branches from the splitter are substantially equivalent (e.g., carrying substantially the same light intensity), but some or all branches can alternatively differ from each other in any suitable manner. In one example, the splitter includes a 1×(N+1) coupler that splits the optical source into N+1 optical branches of substantially equal intensity, followed by a 1×N coupler that splits one of these branches into a further N branches of substantially equal intensity. Accordingly, in this example, the splitter will generate a first set of N branches, each having a first intensity, and a second set of N branches, each having a second intensity less than the first intensity (e.g., less by approximately a factor of N).

Figure 3:
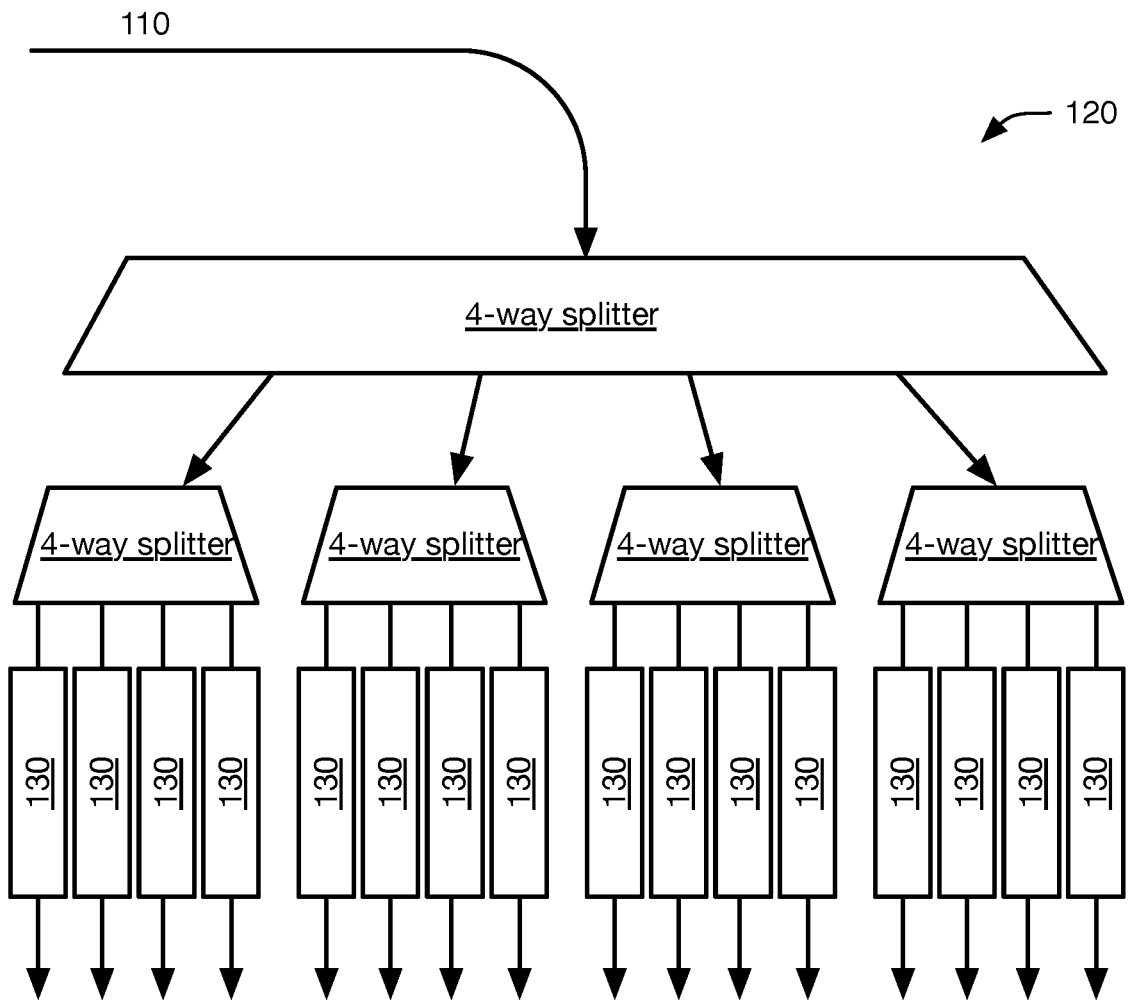
FIG. 3 is a schematic representation of an example of a portion of the system.

In one example, the splitter is a tree splitter, including a plurality of splitter elements in a tree configuration (e.g., including a plurality of two-way splitters arranged in a binary tree). In some variations, the tree splitter can include elements of one or more of the above types, such as including a plurality of 1×m couplers (i.e., couplers that split a single input into m paths, for some integer m) combined in serial layers to provide the desired number of outputs (e.g., N, N+1, or 2N outputs, etc.). For example, the splitter can be a two-stage splitter. In a specific example (e.g., in which the desired number of outputs is a square number s), each stage splits the signal into a number of copies equal to the square root of the desired number (e.g., $\sqrt{s}$). In this specific example, the first stage includes a single $\sqrt{s}$-way splitter, and the second stage includes vs separate $\sqrt{s}$-way splitters, each of which receives an output from the first stage splitter (e.g., as shown in FIG. 3, in which s=16). However, the tree splitter can additionally or alternatively include any other suitable stages and/or number of stages.

However, the system can additionally or alternatively include any other suitable splitter.

2.3 Phase Accumulator Bank.

The phase accumulator bank 130 preferably functions to perform one or more accumulation-based operations (e.g., computing a sum of terms). In some embodiments, the phase accumulator bank is a multiply-accumulate (MAC) bank 130a, which can function to perform one or more multiply-accumulate operations. For example, the MAC bank can function to compute $\Delta\phi=a(b+\Sigma_i x_i w_i)$, wherein $x_i$ and $w_i$ represent elements of the input vectors x and w, respectively, a represents a proportionality constant, and b represents an optional additional bias term.

The PA bank preferably includes two optical paths (e.g., two waveguides, each defining an optical path), which preferably each carry an optical signal (e.g., branches of the optical source, preferably unmodulated branches) from the splitter and allow these optical signals to propagate through the PA bank. In one example, one of the optical paths functions as an accumulator path (e.g., carries an accumulator signal through the PA bank) and the other functions as a reference path (e.g., carries a reference signal through the PA bank). Alternatively, both paths can provide a hybrid accumulator-and-reference function (e.g., wherein they carry a first and second accumulator signal, respectively). However, the paths can additionally or alternatively be used in any other suitable manner, and/or the PA bank can additionally or alternatively include any other suitable number and/or types of optical paths in any suitable arrangements.

The PA bank 130 preferably includes a plurality of PA units 131. Preferably, the PA bank includes one PA unit for each element to be summed (wherein each PA unit is associated with a different element). The PA unit preferably functions to add the associated element to the accumulator; for example, the PA unit can phase shift (e.g., impose a phase delay on) the accumulator signal by a phase shift proportional to the associated element. A person of skill in the art will recognize that the phase shift can optionally be increased by one or more multiples of $2\pi$ (e.g., without change to the result of optical interference between the phase shifted signal and a reference signal, such as performed as described below regarding the detector module); accordingly, the phase shift modulo $2\pi$, rather than the total phase shift, may be proportional to the associated element. In some examples, the PA unit can determine the associated element before adding it to the accumulator. For example, the PA unit can receive one or more input signals, and can compute the associated element based on the input signal(s); additionally or alternatively, the PA unit can compute the associated element based on a value of the accumulator.

The PA units are preferably all arranged along the same optical path of the PA bank (e.g., a first optical path). Alternatively, the PA bank can include one or more PA units on each path (e.g., on both a first path and a second path). In such examples, PA units on the first path preferably phase shift the first accumulator signal by the opposite sign as compared with the phase shifts imposed on the second accumulator signal PA units on the second path. However, the PA units can alternatively have any other suitable numerosity, arrangement, and/or function.

In embodiments in which the PA bank is a MAC bank, each PA unit of the MAC bank is preferably a MAC unit 131a (but alternatively, some of the PA units may not be MAC units). Preferably, the MAC bank includes one MAC unit for each element i over which the sum $\Sigma_i x_i w_i$ is to be calculated, wherein each MAC unit is associated with a different value of i. The MAC unit preferably functions to compute $\phi_i = ax_i w_i$ for the associated value of i, and to add the computed value to the accumulator (e.g., phase shift the accumulator signal by $\phi_i$). The MAC units are preferably all arranged along the same optical path of the MAC bank (e.g., a first optical path). Alternatively, the MAC bank can include one or more MAC units on each path (e.g., on both a first path and a second path). In such examples, MAC units on the first path preferably phase shift the first accumulator signal by $+\phi_i$, whereas MAC units on the second path preferably phase shift the second accumulator signal by $-\phi_i$ (or vice versa). Each MAC unit can be as described below (e.g., in section 2.4). However, the MAC unit can additionally or alternatively include any other suitable elements in any suitable arrangement, and/or the PA bank can additionally or alternatively include any other suitable PA units.

The PA bank can optionally include a compensation phase shifter (or multiple compensation phase shifters). The compensation phase shifter preferably functions to compensate for undesired phase shifts (e.g., introduced due to temperature fluctuations and/or temperature differences between the first and second paths, etc.). The compensation phase shifter can additionally or alternatively function to introduce a bias term b into the computed accumulator signal (e.g., the computed sum $\Delta\phi$). The compensation phase shifter is preferably arranged along one of the optical paths of the PA bank (e.g., the opposite path from the PA units, the same path as some or all of the PA units, etc.). In embodiments including multiple compensation phase shifters, they can all be arranged along a single path, some can be arranged along opposing paths, or they can have any other suitable arrangement. The compensation phase shifter can modulate the phase of the light (e.g., phase of the reference signal) slowly relative to the operation of the PA units (e.g., wherein some or all PA units include phase shifters capable of modulating and/or configured to modulate the light at a substantially faster rate than the compensation phase shifter, such as faster by more than a factor of 3, 10, 20, 50, 100, etc.), but can alternatively operate at any suitable speed. The compensation phase shifter can include one or more electro-optic modulators, acousto-optic modulators, microresonator-based modulators, and/or any other suitable elements configured to controllably shift (e.g., in response to a control signal, such as an electrical signal that controls operation of the phase shifter) the phase of an optical signal propagating through and/or near (e.g., optically coupled to) the phase shifter. The phase shifter can include broadband shifter elements, narrowband shifter elements (e.g., overlapping the optical frequency of the optical signal to be phase shifted), and/or elements that operate on any other suitable optical frequency range(s). However the PA bank can additionally or alternatively include any other suitable compensation phase shifters in any suitable arrangement and/or can omit the compensation phase shifter.

The detector module 132 preferably functions to transduce the optical signals of the PA bank (e.g., accumulator signal and reference signal, first and second accumulator signals, etc.) into one or more electrical signals representative of the computed value (e.g., representative of $\Delta\phi$, of Δϕ/a, and/or of any other suitable value associated with the computation). The detector module preferably includes a directional coupler 1321 (preferably, a 50:50 directional coupler, but alternatively a coupler having any other suitable coupling ratio) that optically couples the two optical paths of the PA bank (e.g., after the PA units and compensation phase shifter, relative to the direction of signal propagation). However, the detector module can additionally or alternatively include any other suitable couplers and/or other elements for enabling optical interference between the two optical signals (or can omit such an element).

Figure 4:
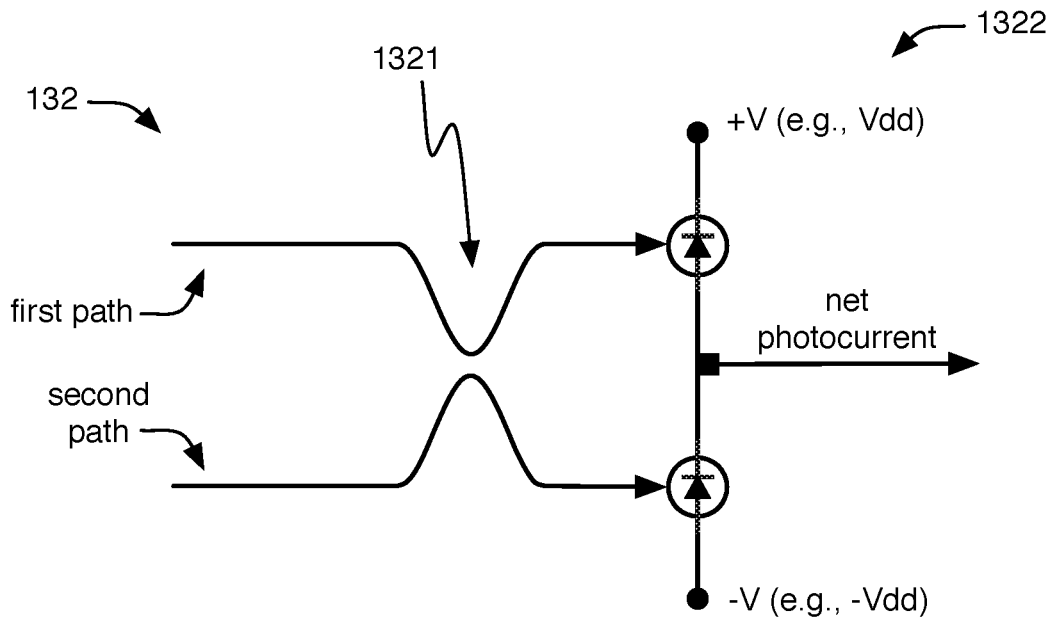
FIGS. 4-5 are schematic representations of a first and second example, respectively, of a detector module.

The detector module 132 preferably includes an optical transducer 1322 that receives the optical signals after interference at the coupler. In a first embodiment, the optical transducer generates an analog electrical signal based on the optical signals. In this embodiment, transducer preferably includes one or more photodetectors. In a first example, the detector module includes two photodetectors (preferably substantially equivalent photodetectors, such as exhibiting substantially equivalent responsivity to the optical signals) arranged in a differential arrangement, wherein each photodetector receives the optical signal from one of the two optical paths and the two photodetectors generate a net photocurrent based on the difference between the optical signal intensities (e.g., as shown in FIG. 4). In a specific example, this net photocurrent is substantially proportional to $2R\Delta\varphi\sqrt{P_s P_p}$, wherein R represents the current responsivity of the photodetectors (assuming substantially equal responsivity for each photodetector), Δϕ represents the phase shift between the signals on the first and second path (prior to interference at the coupler), and $P_s$ and $P_p$ represent the optical power of the signals on the first and second path, respectively (prior to interference at the coupler). In a second example, the transducer includes a single photodetector (e.g., arranged to transduce the optical signal from one of the optical paths). However, the optical transducer can additionally or alternatively include any other suitable photodetectors in any suitable arrangement.

Figure 5:
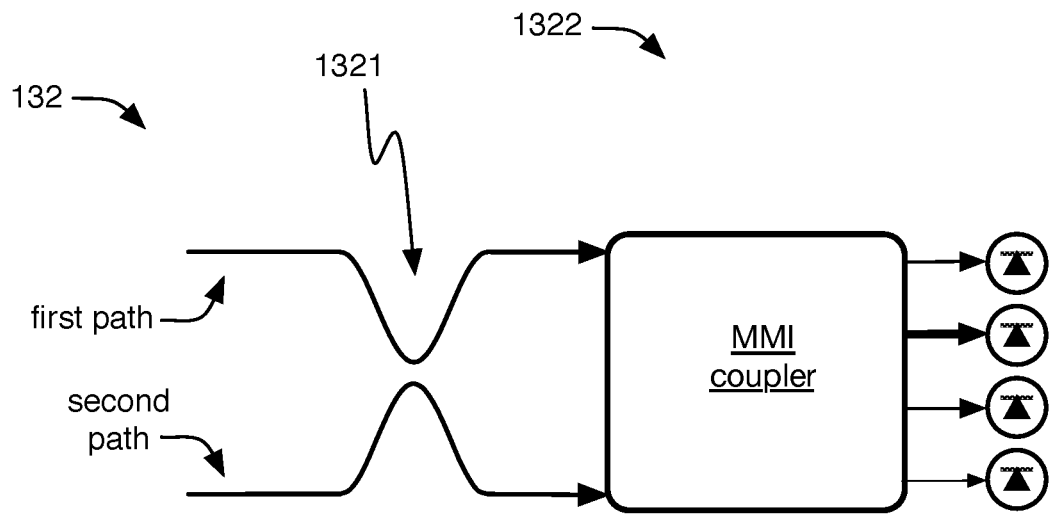

In a second embodiment, the optical transducer includes an optical analog-to-digital converter (ADC), which generates a digital signal (e.g., digital electrical signal) based on the optical signals. In a first variant of this embodiment, the transducer can include an optical ADC that includes one or more multi-mode interference (MMI) couplers (e.g., can include the system, and/or one or more elements thereof, described in U.S. patent application Ser. No. 16/826,008, filed 20 Mar. 2020 and titled "System and Method for Photonic Analog-to-Digital Conversion", which is herein incorporated in its entirety by this reference), such as shown by way of example in FIG. 5.

Figure 7A:
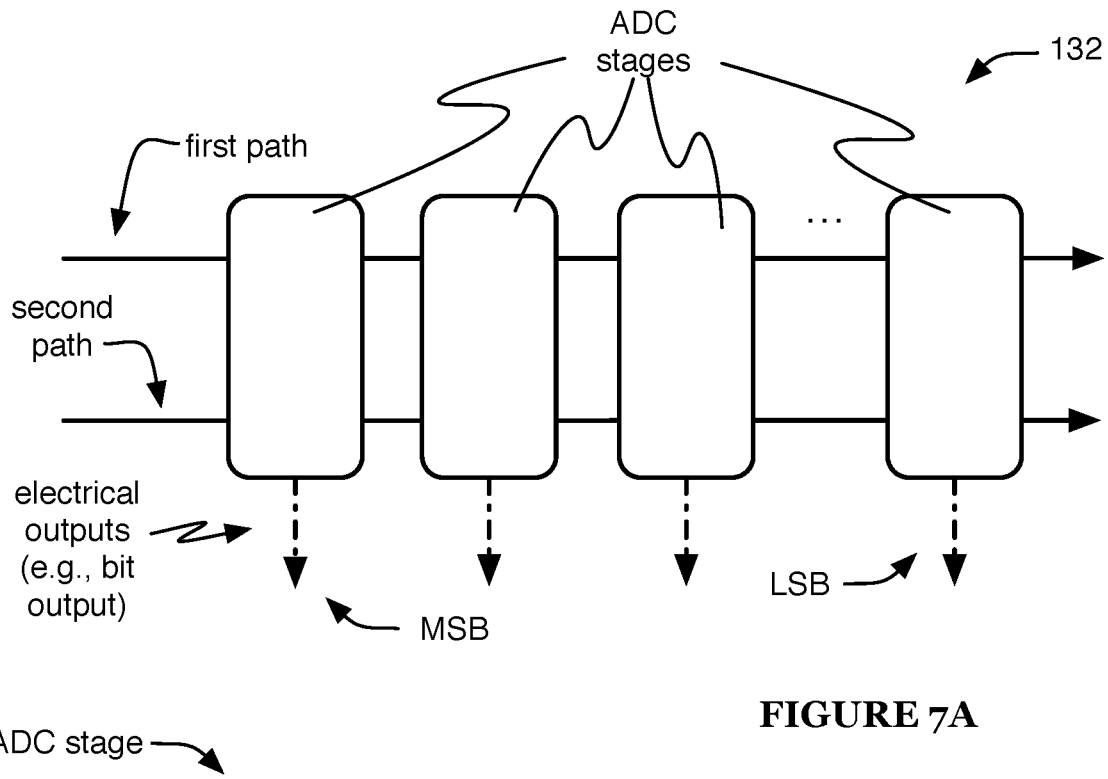
FIG. 7A is a schematic representation of an example of a multi-stage optical ADC.
Figure 7B:
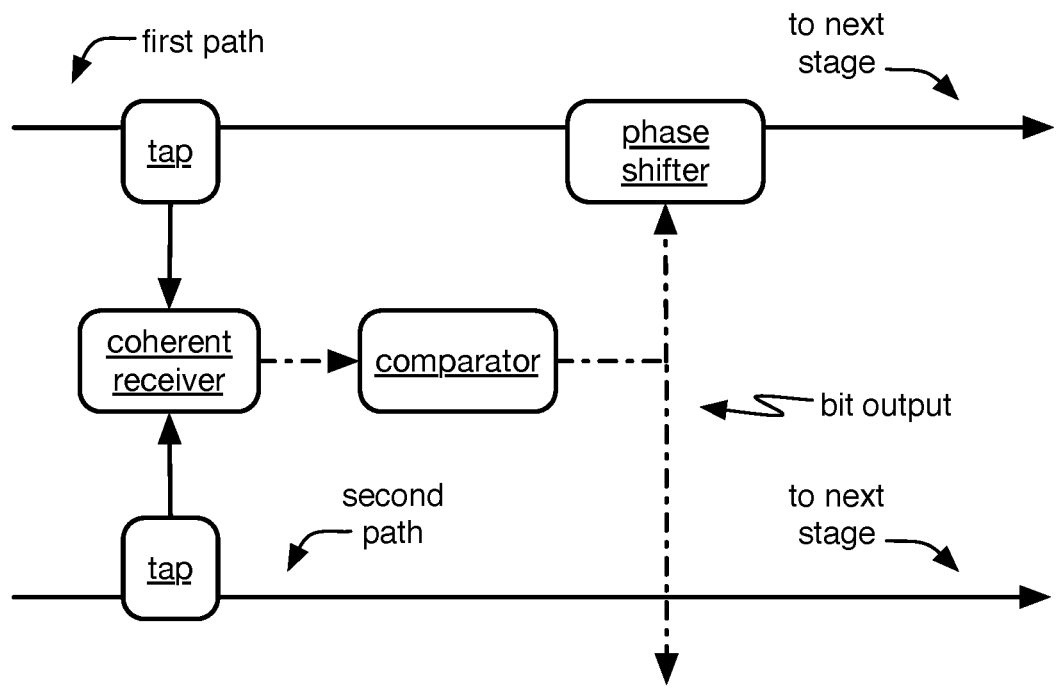
FIG. 7B is a schematic representation of an example of an ADC stage of the multi-stage optical ADC.
Figure 8:
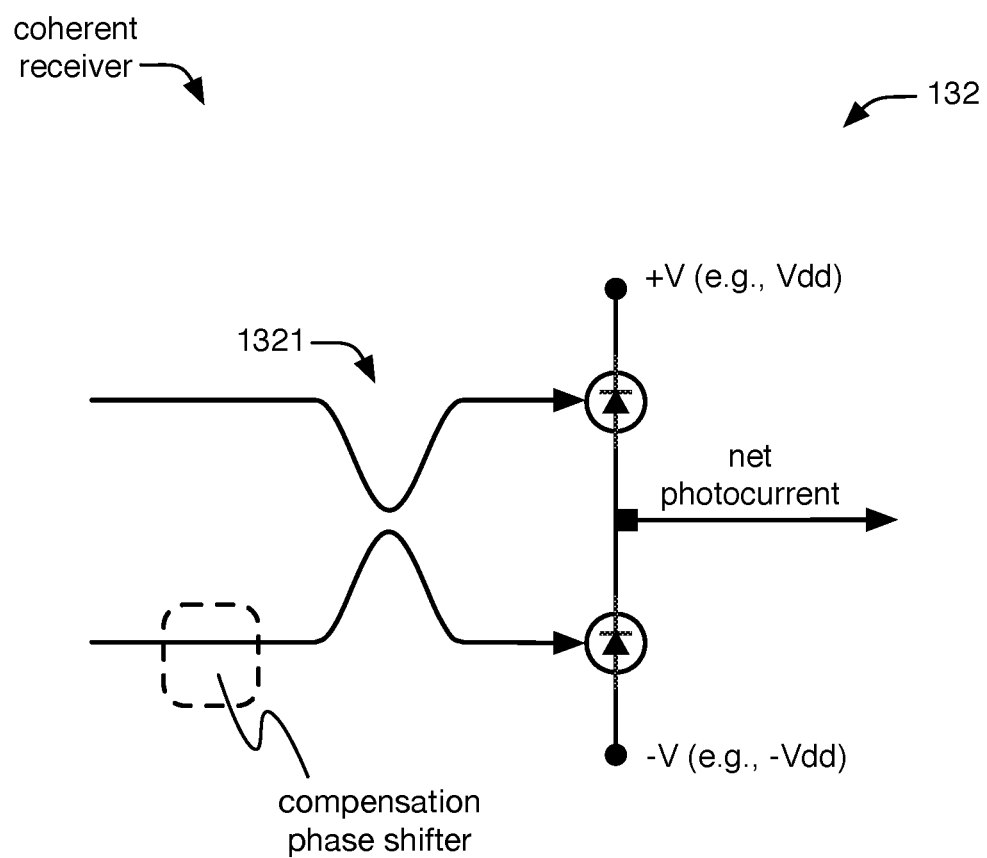
FIG. 8 is a schematic representation of an example of a coherent receiver.

In a second variant (e.g., as shown in FIGS. 7A-7B and/or in Appendix A), the transducer can include a multi-stage optical ADC (e.g., that includes N stages), wherein each stage corresponds to (e.g., determines the value of) a different bit of the digital output (preferably, wherein the first stage determines the most significant bit (MSB), the second stage determines the second most significant bit, and each subsequent stage determines the subsequent lower-significance bit). In this variant, each stage preferably includes: a coherent receiver that receives a portion of the two optical signals (e.g., sampled by one or more taps, such as a 1/N tap, a 50:50 splitter, and/or any other suitable sampling elements) and transduces the optical signal portions into an electrical signal (e.g., current or voltage substantially proportional to a phase difference between the two optical signals); a comparator that generates a bit output based on the coherent receiver output (e.g., 0 bit output for negative coherent receiver outputs, and 1 bit output for positive coherent receiver outputs, or vice versa; bit output determined based on a non-zero threshold for the coherent receiver output; etc.); and a phase shifter that phase shifts one or both optical signals based on the bit output. The optical signals from the stage are preferably provided to the next stage of the optical ADC (e.g., after passing through the phase shifter). The coherent receiver preferably includes (e.g., as shown in FIG. 8) a coupler (e.g., 50:50 coupler) that couples the two optical signal portions, and a pair of photodetectors in a differential arrangement (e.g., as described above regarding the photodetectors of the first embodiment).

In this variant, in response to receiving a 0 bit, the phase shifter preferably does not phase shift the optical signals. In response to receiving a 1 bit, the phase shifter preferably phase shifts one of the optical signals by an amount corresponding to the value of the bit associated with the stage; for example, in response to a 1 bit, the first stage can effect a phase shift between the two signals substantially equal to half of a maximum phase shift of the input optical signals ($\varphi_{max}/2$), whereas the second stage can effect a phase shift of half that magnitude ($\varphi_{max}/4$), and in general, the jth stage can effect a phase shift of $\varphi_{max}/2^j$. Accordingly, if the optical signal represents a value greater than the value of the current stage's bit, that bit's value is subtracted from the optical signal (and if the optical signal value is less than the bit's value, the optical signal value is unchanged or substantially unchanged), and the modified optical signal is passed to the next stage (e.g., which can determine the value of the next, lower-significance bit).

However the optical transducer can additionally or alternatively include any other suitable optical ADC and/or any other suitable transducer, and/or the detector module can additionally or alternatively include any other suitable elements in any suitable arrangement.

2.4 Multiply-Accumulate Unit.

As described above, each MAC unit 131a preferably functions to compute the product of two terms, a multiplier and a multiplicand, which in some embodiments is modified by a proportionality constant a (wherein the value of a is preferably constant across all MAC units of a MAC bank). These terms are preferably the elements (e.g., $x_i$ and $w_i$, for the value of i associated with the MAC unit) of the vectors being multiplied by the MAC bank, but can additionally or alternatively be any other suitable terms to be multiplied.

Figure 6A:
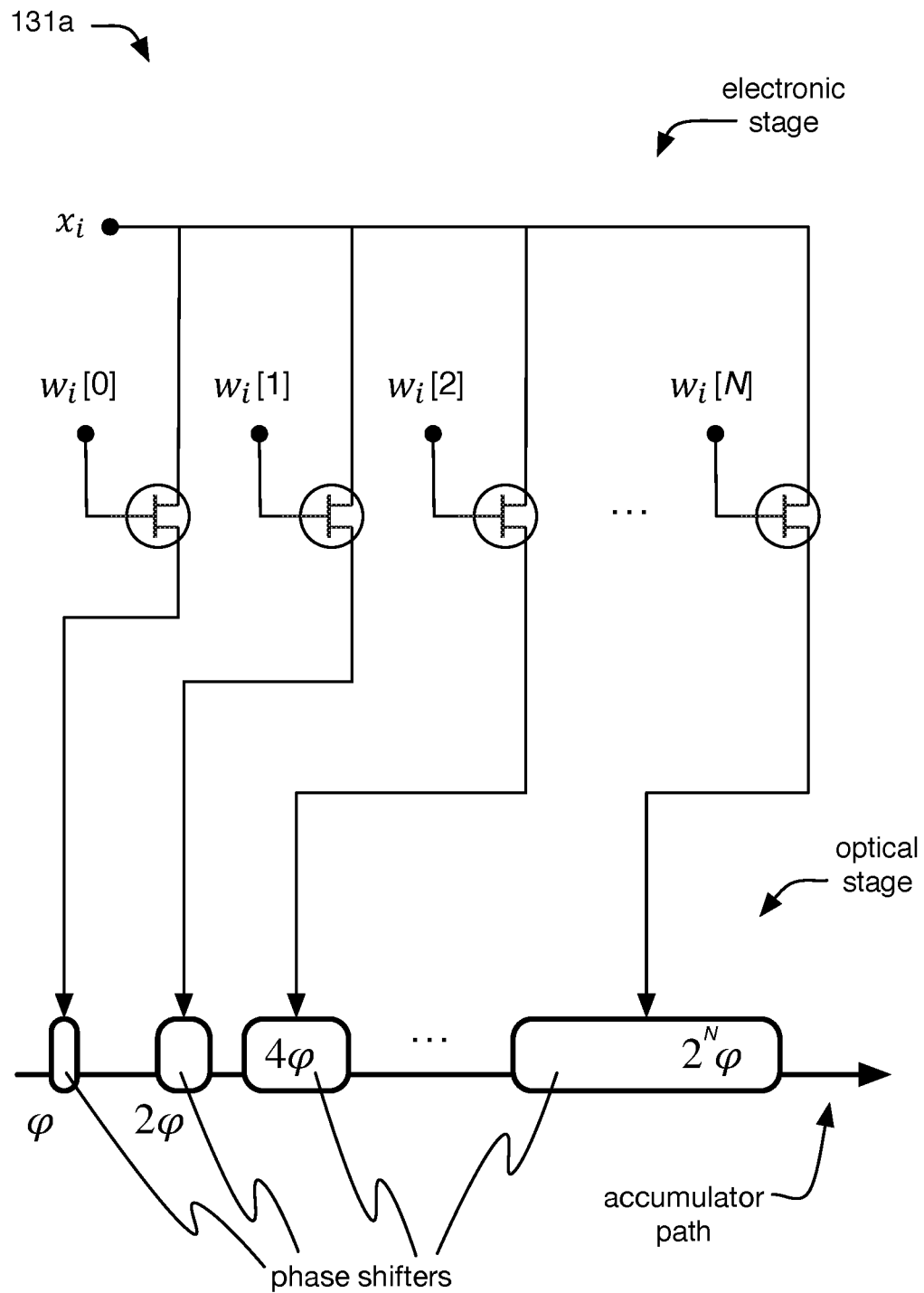
FIGS. 6A-6D are schematic representations of various examples of a MAC unit.

In a first embodiment of the MAC unit, the MAC unit receives the multiplier term (e.g., $x_i$) as an analog electrical input (e.g., analog voltage signal) and receives the multiplicand term (e.g., $w_i$) as a digital electrical input (e.g., deserialized binary signals, each associated with a different bit of the multiplicand). In this embodiment, the electronic stage preferably includes a plurality of switches (e.g., transistors), with one switch associated with each bit of the multiplicand (e.g., as shown in FIG. 6A, wherein each bit of the multiplicand is denoted as $w_i[b]$, for a bit index b). The optical stage preferably includes a plurality of phase shifters, more preferably the same number of phase shifters as the number of switches (and/or as the number of multiplicand bits, which is preferably equal to the number of switches).

In this embodiment, each phase shifter is preferably associated with a different phase shift response (e.g., maximum phase shift achieved under normal operating conditions; control signal, such as applied voltage, required to achieve a x phase shift (defined as a voltage of $V_\pi$) and/or a phase shift of any other suitable constant amount; derivative of phase shift caused with respect to control signal magnitude, or ratio of phase shift caused to control signal magnitude; etc.). These differences can be achieved using phase shifters of different length (e.g., optical path length), achieved by having phase shifters with different optical, electrical, and/or electro-optical properties, and/or achieved in any other suitable manner. In some examples, the modulation response of the phase shifters can define (or substantially define) a geometric series. The geometric series is preferably associated with an integer factor, more preferably wherein the factor is a power of two (e.g., 2, 4, 8, 16, etc.). In a specific example, the phase shifters have modulation responses (e.g., and lengths) substantially proportional to successive powers of two. However, the factor can be any other suitable integer (e.g., 3-15, greater than 15, etc.), can be a non-integer factor (e.g., e, the base of the natural logarithm), and/or the geometric series can define any other suitable factor.

In this embodiment, each bit of the multiplicand (e.g., provided as a deserialized binary signal) controls a different switch of the electronic stage (e.g., is provided as input to the gate or base of the associated transistor). The analog multiplier signal (e.g., represented as an analog voltage) can be provided to each switch (e.g., input to one of the other terminals of the transistor, such as the collector, emitter, source, or drain). Each switch will either output a zero signal (if the associated multiplicand bit is zero) or a value substantially equal to the analog multiplier signal (if the associated multiplicand bit is one). The switch output is provided to the associated phase shifter of the optical stage, wherein the association is based on the bit significance of the multiplicand bit controlling the switch. Accordingly, the signal associated with the multiplicand's most significant bit is provided to the shifter with the highest phase shift response (e.g., the longest shifter), the signal associated with the least significant bit (LSB) of the multiplicand is provided to the shifter with the lowest phase shift response (e.g., the shortest shifter), and the intermediate significance bits are provided in order to the shifters having intermediate values of phase shift response (e.g., intermediate-length shifters). In an alternate variation, each phase shifter has a substantially identical modulation response, and the multiplicand is represented as parallel unary electrical signals (e.g., thermometer code), wherein each unit signal controls a different phase shifter (e.g., either causing substantially no phase shift or causing a phase shift amount corresponding to one unit, based on whether the signal has a 0 or 1 value). However, this embodiment can additionally or alternatively include any other suitable electronic and/or optical elements.

In a second embodiment, the MAC unit receives both terms to be multiplied in a digital (e.g., binary) representation. The multiplier and/or multiplicand can be represented as serialized binary signals (e.g., provided on a single electrical conductor), represented as deserialized binary signals (e.g., wherein each bit of the value is provided on a separate electrical conductor), represented as serialized or deserialized non-binary digital signals (e.g., signals having 3, 4, 8, and/or any other suitable number of levels), and/or provided in any other suitable digital representation.

Figure 6B:
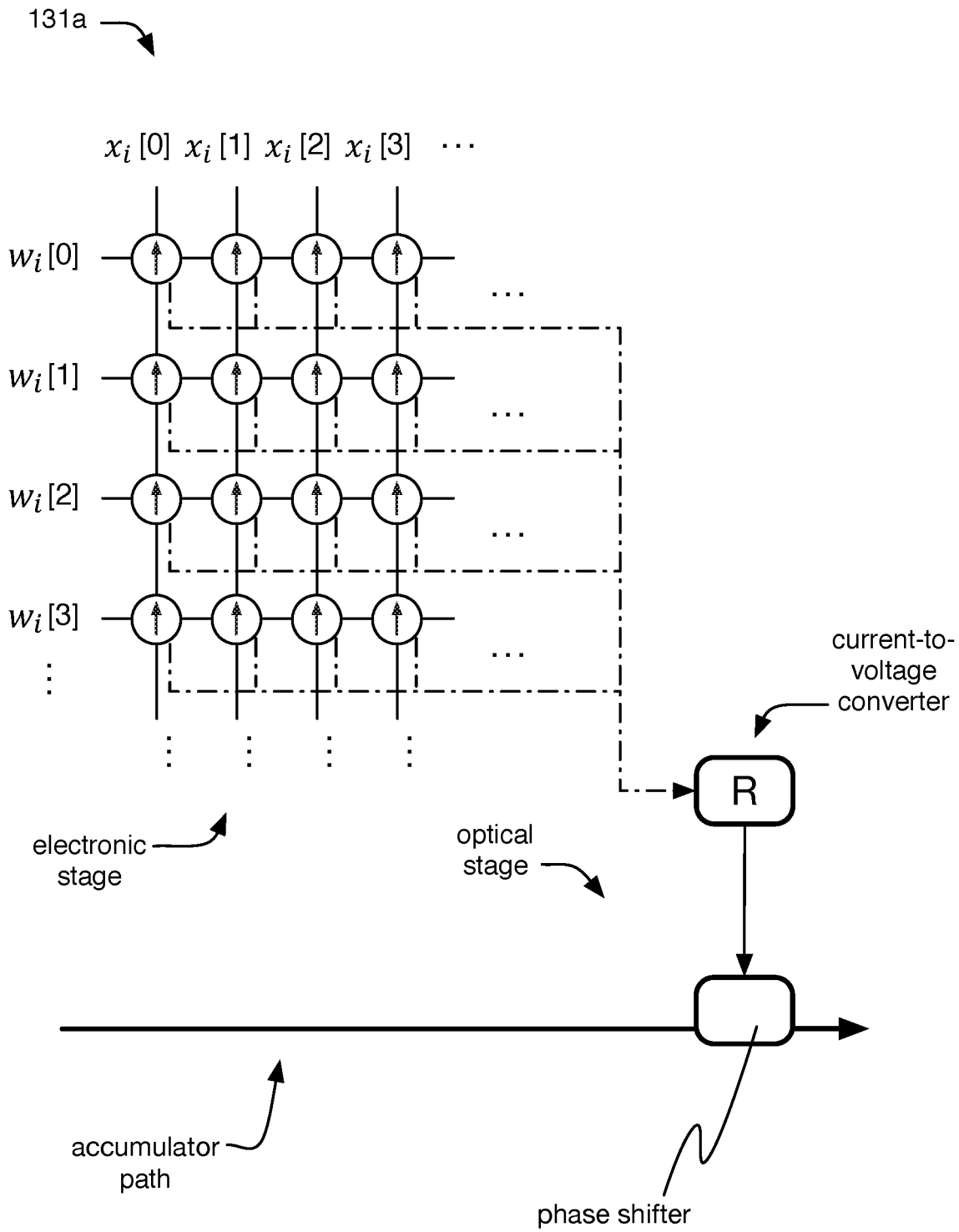

In a first variant of this embodiment, the MAC unit includes a crossbar current source (e.g., as shown in FIG. 6B). In this variant, the electronic stage performs analog computation of the product $x_i w_i$. The input signals are preferably received as deserialized binary signals (and/or can be deserialized at the MAC unit). The electronic stage preferably defines a crossbar arrangement, wherein each bit of the multiplier defines a respective junction with each bit of the multiplicand. For each of these crossbar junctions (e.g., each pair of input bits), the junction can control a current source substantially equal to $I_0 2^{b_x + b_w}$, wherein $b_x$ represents the bit index of the multiplier and $b_w$ represents the bit index of the multiplicand (wherein the least significant bit has a bit index of zero, and the bit index is incremented for each successively more significant bit thereafter). Preferably, the crossbar junction controls the current source such that the source is in an ON state (e.g., wherein the $I_0 2^{b_x + b_w}$ current is output) if both the multiplier and multiplicand bit are one, and is in an OFF state (e.g., wherein substantially no current is output) if either bit is zero. The electronic stage preferably sums the currents output from all junctions of the crossbar, thereby resulting in a total output current proportional to the product to be computed. This output current can be converted into a voltage (preferably substantially proportional to the output current), and the voltage can be provided as an intermediary electrical signal which drives a single phase shifter of the optical stage (wherein the optical stage preferably includes only one phase shifter). This preferably results in a phase shift substantially proportional to the product $x_i w_i$ being imposed on the accumulator signal by the phase shifter.

Figure 6C:
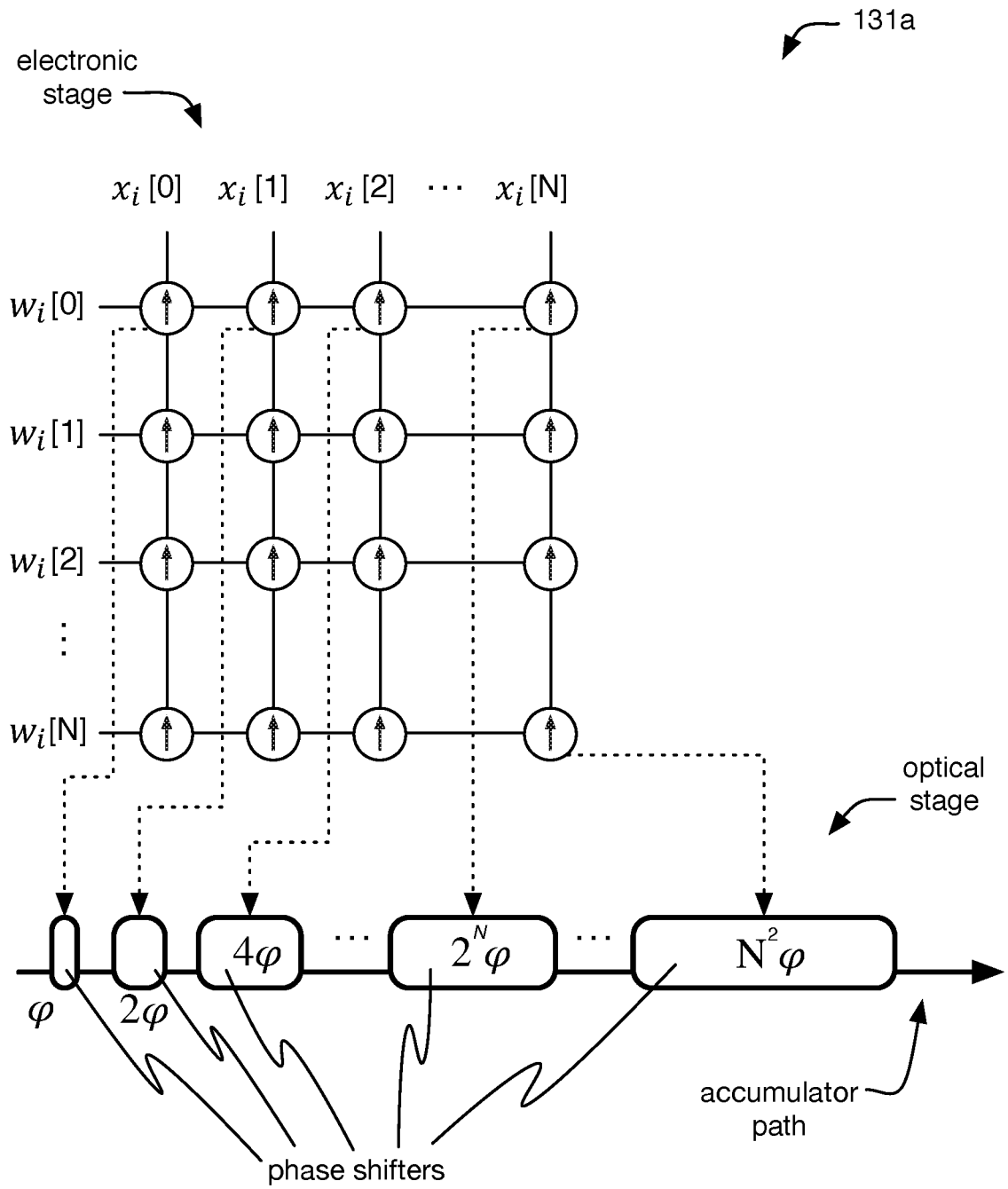

In a second variant of this embodiment (e.g., as shown in FIG. 6C), the multiplier and multiplicand are preferably received as deserialized binary signals, wherein the electronic stage defines a crossbar arrangement (e.g., as described above regarding the first variant, such as wherein each bit of the multiplier defines a respective junction with each bit of the multiplicand). In this variant, the crossbar functions to perform bitwise digital computation of the product $x_i w_i$. For each crossbar junction (e.g., each pair of input bits, one from the multiplicand and one from the multiplier), a binary AND output is generated, wherein the junction is ON (e.g., the output is one) if both the multiplier and multiplicand bit are one, and the junction is OFF (e.g., the output is zero) if either input bit is zero. The digital stage preferably defines a fanout structure, wherein each crossbar junction output is provided to a different phase shifter of the optical stage.

In this variant, the optical stage preferably includes $N_w N_x$ different phase shifters (wherein $N_w$ represents the number of bits of $w_i$ and $N_x$ represents the number of bits of $x_i$). Each of these phase shifters preferably corresponds to a different junction of the electronic stage crossbar. Each phase shifter preferably has a phase shift response proportional to (e.g., a length proportional to) $2^{b_x + b_w}$ for the junction with which it is associated. Accordingly, each phase shifter will effect a phase shift on the accumulator signal substantially proportional to $2^{b_x + b_w}$ if the corresponding junction is ON and will effect substantially no phase shift if the corresponding junction is OFF. Thus, the phase shifters of the optical stage will collectively compute the sum of the bitwise products output by the digital stage.

Figure 6D:
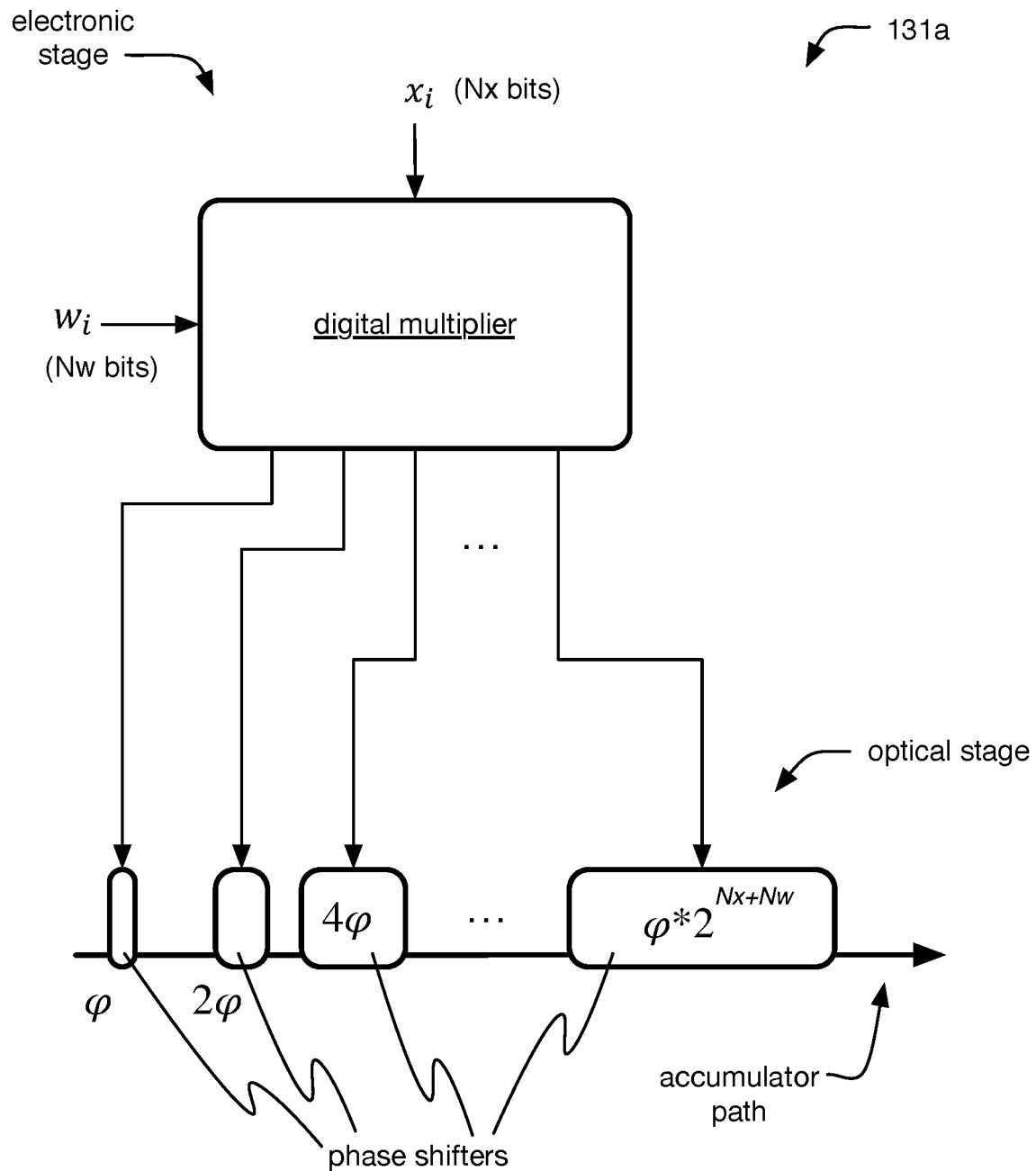

In a third variant of this embodiment (e.g., as shown in FIG. 6D), the electronic stage includes a digital multiplier unit which performs digital computation of the product $x_i w_i$. The electronic stage preferably receives a digital electronic representation of the multiplier and multiplicand (preferably as serialized binary signals, but alternatively as deserialized binary signals, non-binary digital signals, etc.). The digital multiplier preferably receives the digital input signals, computes the product, and outputs as intermediary electrical signals a deserialized digital representation (e.g., binary representation) of the product, wherein each output corresponds to a different digit (e.g., bit) of the product. In this variant, the optical stage preferably includes a plurality of phase shifters. The plurality of phase shifters preferably define (or substantially define) a geometric series (e.g., geometric series associated with an integer factor, such as wherein the modulation responses are substantially proportional to successive powers of two), such as described above regarding the phase shifters of the first embodiment. The number of phase shifters of the optical stage is preferably equal to the number of digits (e.g., bits) output by the digital multiplier (e.g., to preserve all precision possible, equal to $N_w N_x$). Each phase shifter is preferably controlled by the associated intermediary electrical signal, wherein the association is based on the bit significance of the intermediary signal and on the phase shifter response. Accordingly, the signal associated with the intermediary electrical signal's most significant bit is provided to the shifter with the highest phase shift response (e.g., the longest shifter), the signal associated with the least significant bit of the intermediary electrical signal is provided to the shifter with the lowest phase shift response (e.g., the shortest shifter), and the intermediate significance bits are provided in order to the shifters having intermediate values of phase shift response (e.g., intermediate-length shifters). In an alternate variation, each phase shifter has a substantially identical modulation response, and the multiplicand is represented as parallel unary electrical signals (e.g., analogous to the unary encoding variation described above).

In a third embodiment, the MAC unit receives both inputs as analog signals (or, alternatively, can receive one or both inputs as a digital signal and use one or more digital-to-analog converters (DACs) to convert each digital signal into an analog representation). In this embodiment, the electronic stage preferably includes an analog multiplier unit. The analog multiplier unit can include one or more differential amplifier-based multipliers, Gilbert cells, and/or any other suitable analog electrical multipliers. The analog multiplier preferably receives the analog input signals, and outputs (as an intermediary electrical signal) an analog electrical representation of the product (e.g., having a voltage proportional to the product). In this embodiment, the optical stage preferably includes a single phase shifter driven by the intermediary electrical signal (e.g., as described above regarding the first variant of the second embodiment).

Some of the embodiments described above may specify formats (e.g., digital vs. analog, electrical vs. optical, etc.) in which various embodiments of the MAC unit receive one or more inputs. As a person of skill in the art will recognize, such embodiments of the MAC unit can alternatively receive one or more inputs in a different format, and can include one or more elements that function to convert the input(s) into the appropriate format. In examples, a digital input can be converted to analog using a DAC, an analog input can be converted to digital using an analog-to-digital converter (ADC), and/or an optical input can be converted to electrical using an optical transducer.

However, the MAC unit can additionally or alternatively include any other suitable elements in any suitable arrangement and/or receive any other suitable inputs of any suitable representation.

2.5 Alternate Arrangements.

In some embodiments, elements of the system can additionally or alternatively function to transmit, reduce (e.g., sum), and/or broadcast information (e.g., optically) between computing system elements (e.g., memory and/or computation elements, such as optical and/or electronic computation elements, etc.). In some examples, some or all such computing system elements may be separated by distances such that performing these functions (e.g., transmission, broadcasting, reduce operations such as summing, etc.) electronically can introduce disadvantages, such as power consumption due to charging and/or discharging of electrical conductors that communicatively couple the elements. Accordingly, it can be advantageous to perform some or all of these functions optically.

Figure 9A:
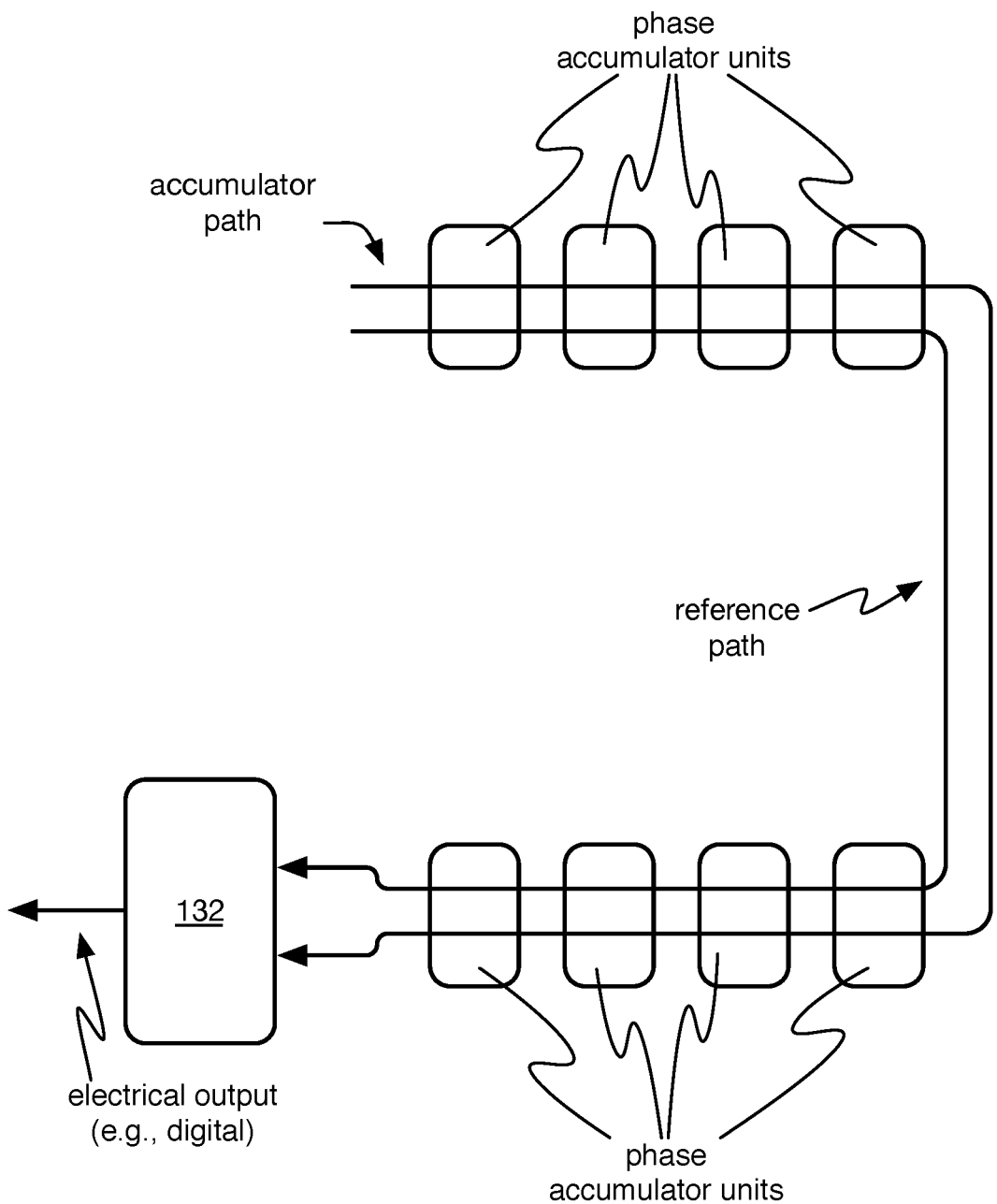
FIGS. 9A-9B are schematic representations of alternate embodiments of the system.
Figure 9B:
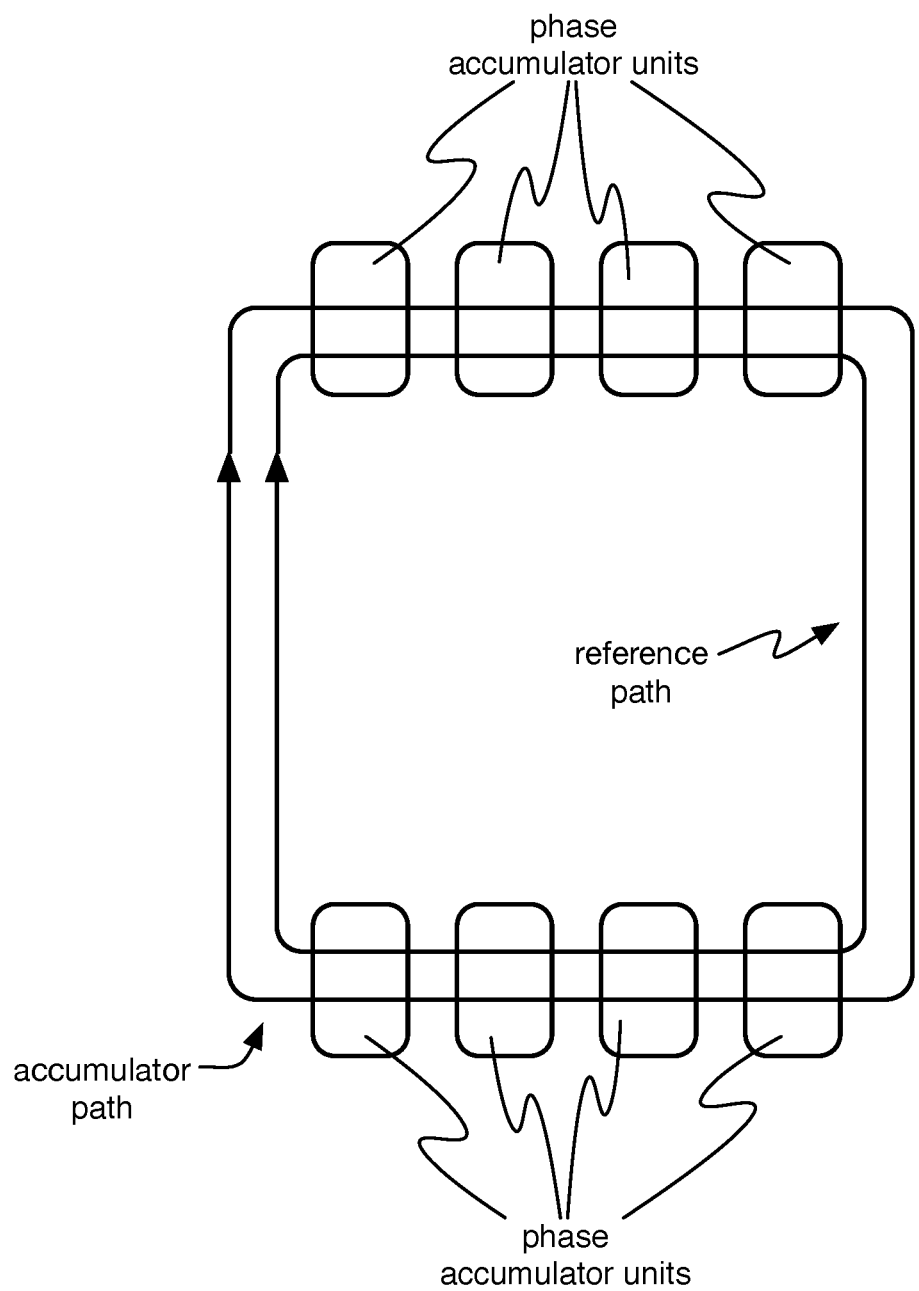

In some examples, the system includes a plurality of phase accumulator unit associated with (e.g., arranged along) an optical path (e.g., waveguide), such as shown by way of examples in FIGS. 9A-9B. Each phase accumulator unit preferably includes one such computing system element, preferably configured to provide an output to one or more phase shifters associated with the optical path. The phase shifters can be configured such as described above (e.g., regarding the PA banks, PA units, and/or MAC units), and/or can include any other suitable phase shifters. In such examples, each phase accumulator unit can perform only an accumulate operation, and not a multiply operation (but can alternatively perform any suitable computation before performing the accumulate operation). For example, the phase accumulator unit can receive a single input value (e.g., from the computing system element, such as a value retrieved from or computed by the computing system element), and can phase shift light propagating along the optical path by an amount corresponding to (e.g., representative of, such as proportional to) the input value. Accordingly, a group of such phase accumulator units can collectively phase shift the light by an amount corresponding to (e.g., representative of, such as proportional to) a sum of (and/or any other suitable reduction of) a set of input values (e.g., each input value from a different phase accumulator unit of the group).

A phase accumulator unit can include one or more phase shifters. In a first example, the phase accumulator unit includes a single phase shifter, such as wherein the value to be added to the accumulator is represented by an analog electrical signal provided to the phase shifter (e.g., analog voltage signal used to control the phase shifter). In a second example, the phase accumulator unit includes multiple phase shifters, each preferably associated with a different phase shift response (e.g., analogous to the phase shifters of the MAC unit described above), such as phase shift responses defining a geometric series (e.g., with a common ratio of a power of two, preferably 2). For example, the phase shift responses of the phase shifters can define a geometric series with a common ratio of 2, and the value to be added to the accumulator can be represented by a set of parallel binary electrical signals (e.g., each bit of the value represented by a different electrical input), wherein each signal is provided to a different phase shifter (e.g., the most significant bit provided to the phase shifter with the largest response, the least significant bit provided to the phase shifter with the smallest response, and so on). However, the phase accumulator unit can additionally or alternatively include any other suitable phase shifter(s) in any suitable arrangement.

The phase accumulator units (or a subset thereof, and/or any other suitable elements of the system) can optionally include one or more detector modules (e.g., as described above) configured to detect the phase shift of the light (e.g., transduce the light, or a portion thereof, into an electrical signal representative of the magnitude of the phase shift). For example, a phase accumulator unit can include a splitter on each optical path (e.g., configured to sample a small fraction of the light intensity on the optical path, such as 0-1%, 1-2%, 2-5%, etc.), wherein one output of the splitter (e.g., primary output including most of the input light intensity) continues along the optical path, and a second output of the splitter (e.g., sampling output including a small fraction of the input light intensity) is provided to a detector module. Such an arrangement can enable determination of the value (e.g., partially-accumulated value) represented by the accumulated phase shifts on the optical paths up to the point of the splitter.

However, the system can additionally or alternatively include any other suitable elements in any suitable arrangement, and/or can provide any other suitable functions.

3. Material Platforms.

The system (and/or elements thereof, such as some or all of the photonic elements) can be implemented on one or more material platforms, such as photonic integrated circuit platforms (e.g., silicon photonics platforms, monolithically integrated photonics and electronics platforms, other photonic platforms, etc.), microelectronic platforms, and/or any other suitable material platforms. In a first embodiment, the system is implemented as a monolithic platform (e.g., including both photonic elements and electronic elements on a single chip). In a second embodiment, the system is implemented as a heterogeneously integrated platform, such as a platform including two or more chips (e.g., with electronic and/or photonic interfaces between the chips). For example, the heterogeneously integrated platform can include a photonics chip including photonic elements (e.g., and relatively few or no electronic elements, relatively few or no electronic elements with fabrication dimensions below a threshold, etc.; alternatively, including significant electronic elements) and an electronics chip including electronic elements (e.g., and few or no photonic elements; alternatively, including significant photonic elements). In some examples (e.g., of the second embodiment), the system is fabricated via co-integration (e.g., between electronics and photonics), such as wherein different elements of the system can be joined together (e.g., for wafer-to-wafer, die-to-wafer, and/or die-to-die bonding) using one or more packaging technologies such as flip chip bonding, wafer bonding (e.g., direct bond interconnect, hybrid bonding, etc.), through-oxide vias (TOVs), through-silicon vias (TSVs), metal bonding (e.g., eutectic bonding), adhesive bonding, and/or any other suitable bonding interfaces.

In one embodiment, the system can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAMs, etc.). Additionally or alternatively, the system can include elements implemented in one or more III-V platforms (e.g., JePPix consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InGaAsP alloys, such as InP or GaAs substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which elements from a 7 nm electronics platform (e.g., with a 0.6-0.8V limit, such as a 0.65, 0.7, or 0.75 V limit) are coupled with elements from a silicon photonics platform, the silicon photonics platform elements can include transistors (e.g., configured to amplify signals received from the electronics platform elements) operating with voltages in excess of the electronics platform limit.

The system can additionally or alternatively include elements implemented in a monolithically integrated photonics and electronics platform (e.g., platform typically used for microelectronics) such as a monolithically integrated silicon photonics and electronics platform, preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPix consortium TriPLEX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

In a specific example, the system includes elements fabricated such as described in U.S. Pat. No. 8,027,587, issued 27 Sep. 2011 and titled "Integrated Optic Vector-Matrix Multiplier", which is hereby incorporated in its entirety by this reference (e.g., elements fabricated as described regarding fabrication on silicon-on-insulator wafers).

A person of skill in the art will recognize that the elements described herein using the term "waveguide" can additionally or alternatively include any other suitable optical paths and/or elements associated with optical paths (including, without limitation, free-space paths and/or paths including free-space segments).

However, the system can additionally or alternatively be implemented in any other suitable material platform, and can additionally or alternatively include any other suitable materials.

4. Method.

Figure 10:
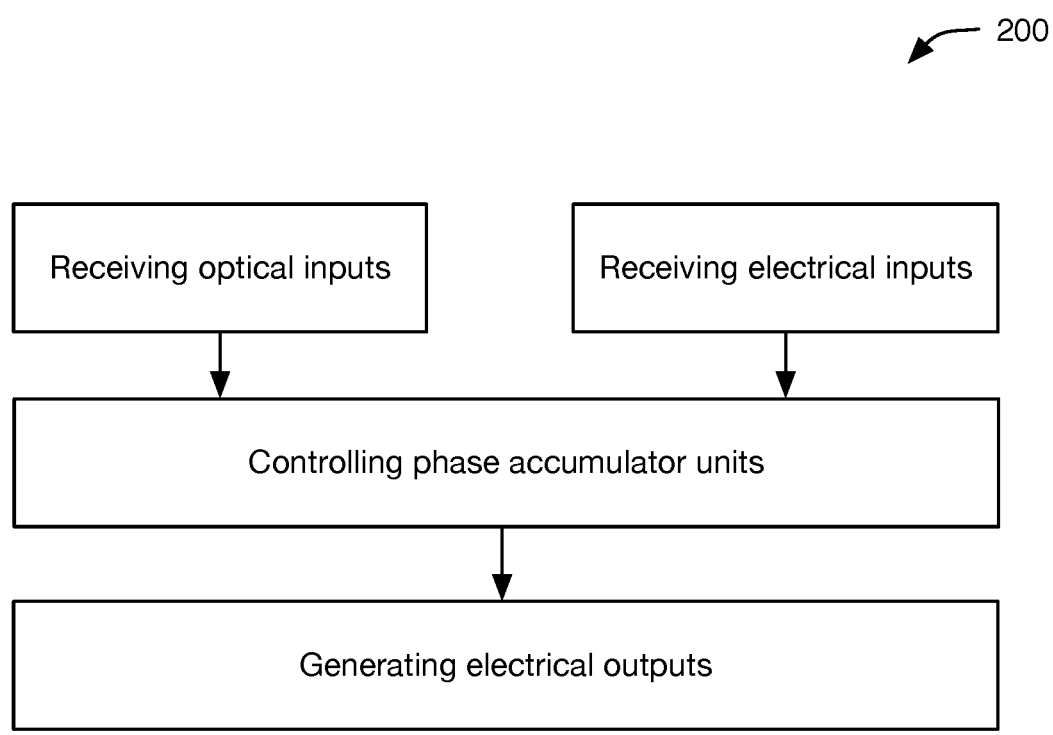
FIG. 10 is a schematic representation of an embodiment of a method.

The method 200 preferably includes receiving one or more optical inputs, receiving one or more electrical inputs, controlling one or more phase accumulator units based on the electrical inputs, and generating one or more electrical outputs based on optical signals (e.g., as shown in FIG. 10), but can additionally or alternatively include any other suitable elements performed in any suitable manner. The elements of the method 200 are preferably performed using the system 100 (e.g., performed such as described above in more detail regarding functionality of elements of the system), but can additionally or alternatively be performed using any other suitable systems.

The optical inputs can be received from one or more optical sources, splitters, and/or any other suitable elements. The optical inputs are preferably coherent inputs, preferably have substantially the same wavelength as each other, and preferably have substantially the same intensity as each other, but can additionally or alternatively have any other suitable characteristics.

The received electrical (e.g., electronic) inputs are preferably representative of one or more computation input values (e.g., summands, multipliers, multiplicands, etc.). The electrical inputs can include analog inputs (e.g., wherein the current or voltage is proportional to the represented value), digital inputs (e.g., serialized and/or parallel binary representations of the value), and/or any other suitable inputs. However, the electrical inputs can additionally or alternatively have any other suitable characteristics.

Controlling the phase accumulator unit(s) based on the electrical inputs preferably includes imposing phase shifts on one or more of the optical inputs. In a first embodiment, the electrical inputs are used directly to drive one or more phase shifters of the PA units. In a second embodiment, the PA units perform computations (e.g., electronic computations) based on the electrical inputs, and drive one or more phase shifters based on the results of these computations. However, the electrical inputs can additionally or alternatively be used in any other suitable manner.

Generating the electrical output(s) preferably includes optically coupling two or more of the optical signals (e.g., after imposing phase shifts such as described above), such as optically interfering the signals, and using one or more optoelectrical transducers to generate the electrical output(s) based on the optical signals (e.g., post-coupling). However, the electrical outputs can additionally or alternatively be generated in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for optical computation, comprising:
   at a first optical path, receiving a first optical input, wherein:
   the first optical input is coherent;
   the first optical path is optically coupled to a plurality of phase shifters; and
   the first optical input propagates along the first optical path, past the plurality of phase shifters, to an optical coupler;
   receiving a first electrical signal representative of a multiplier vector comprising a plurality of multipliers;
   receiving a second electrical signal representative of a multiplicand vector comprising a plurality of multiplicands, wherein:
   a first bijective function maps each multiplier of the multiplier vector to a corresponding multiplicand of the multiplicand vector; and
   a second bijective function maps each multiplier of the plurality of multipliers to a corresponding phase shifters of the plurality of phase shifters;
   for each multiplier of the plurality of multipliers:
   determining a respective product of the multiplier with the corresponding multiplicand; and
   at the corresponding phase shifters, based on the respective product, imposing a respective phase delay on the first optical input;
   concurrent with receiving the first optical input, at a second optical path, receiving a second optical input, wherein:
   the second optical input is coherent;
   the first and second optical inputs each comprise light of a first wavelength; and
   the second optical input propagates along the second optical path to the optical coupler;
   at the optical coupler, generating at least one optical interference output by optically coupling the first and second optical inputs;
   providing the at least one optical interference output to an optoelectrical detector; and
   at the optoelectrical detector, transducing the at least one optical interference output into an electrical output signal associated with a dot product of the multiplier vector and the multiplicand vector.

2. The method of claim 1, wherein, for each multiplier of the plurality, the respective phase delay is proportional to the respective product.

3. The method of claim 1, further comprising, at an optical splitter, splitting a shared coherent optical input into the first optical input and the second optical input.

4. The method of claim 1, wherein:
the multiplier vector further comprises a second plurality of multipliers disjoint from the plurality of multipliers;
the multiplicand vector further comprises a second plurality of multiplicands disjoint from the plurality of multiplicands;
the second optical path is optically coupled to a second plurality of phase shifters, wherein the second optical input propagating along the second optical path to the optical coupler comprises propagating past the second plurality of phase shifters;
a third bijective function maps each multiplier of the second plurality of multipliers to a corresponding phase shifter, of the second plurality of phase shifters; and
the method further comprises, for each multiplier of the second plurality of multipliers:
determining a respective product of the multiplier with a corresponding multiplicand; and
at the corresponding phase shifter, based on the respective product, imposing a respective phase delay on the second optical input.

5. The method of claim 1, wherein the electrical output signal is representative of the dot product.

6. The method of claim 5, wherein the electrical output signal is proportional to the dot product.

7. The method of claim 1, wherein the second optical input propagating along the second optical path to the optical coupler comprises propagating past a compensation phase shifter.

8. The method of claim 7, further comprising:
receiving a third electrical signal representative of a bias term; and
at the compensation phase shifter, imposing a compensation phase delay on the second optical input, comprising applying the third electrical signal to the compensation phase shifter;
wherein the electrical output signal is proportional to a sum of the dot product and the bias term.

9. The method of claim 1, wherein the optical coupler comprises a directional coupler, wherein the at least one optical interference output comprises a first output and a second output.

10. The method of claim 9, wherein:
the optoelectrical detector comprises a balanced photodiode pair; and
providing the at least one optical interference output to the optoelectrical detector comprises:
providing the first output to a first photodiode of the balanced photodiode pair; and
providing the second output to a second photodiode of the balanced photodiode pair.

11. The method of claim 9, wherein:
the optoelectrical detector comprises:
a multi-mode interference (MMI) coupler; and
a plurality of photodiodes, wherein each photodiode of the plurality is arranged on a respective output path of the MMI; and providing the at least one optical interference output to the optoelectrical detector comprises providing the first and second outputs to the MMI coupler.

12. The method of claim 1, wherein, for each multiplier of the plurality of multipliers:
determining the respective product comprises generating a respective electrical signal proportional to the product; and
imposing the respective phase delay comprises applying the respective electrical signal to the corresponding phase shifter.

13. The method of claim 12, wherein each phase shifter of the plurality of phase shifters comprises a single phase shifter optically coupled to the first optical path.

14. The method of claim 1, wherein:
the first bijective function maps a first multiplier of the multiplier vector to a first multiplicand of the multiplicand vector;
the second bijective function maps the first multiplier to a first phase shifter of the plurality of phase shifters;
the first phase shifter comprises a plurality of different phase shifters optically coupled to the first optical path;
each phase shifter of the plurality of different phase shifters defines a respective phase shift response, wherein the phase shift responses define a geometric series;
determining the product of the first multiplier with the first multiplicand comprises generating a plurality of electrical signals associated with the product; and
the method further comprises providing each electrical signal of the plurality of electrical signals to a respective different phase shifter of the first phase shifter.

15. The method of claim 14, wherein the plurality of electrical signals defines a parallel binary electronic representation of the product, wherein the geometric series defines a common ratio of 2.

16. The method of claim 14, wherein the geometric series defines a common ratio of 2, wherein generating the plurality of electrical signals comprises:
providing an analog electrical representation of the first multiplier to a respective switched input of each of a plurality of transistors;
generating a parallel binary electronic representation of the first multiplicand comprising a plurality of multiplicand bits;
for each transistor of the plurality, providing a respective multiplicand bit of the plurality to a switching input of the transistor; and
at a respective output of each transistor of the plurality, providing an electrical signal of the plurality of electrical signals.

17. The method of claim 1, further comprising:
at a third optical path, receiving a third optical input, wherein:
the third optical input is coherent;
the third optical path is optically coupled to a second plurality of phase shifters; and
the third optical input propagates along the third optical path, past the second plurality of phase shifters to a second optical coupler;
receiving a third electrical signal representative of a second multiplier vector comprising a second plurality of multipliers, wherein:
a third bijective function maps each multiplier of the second multiplier vector to a corresponding multiplicand of the multiplicand vector; and a fourth bijective function maps each multiplier of the second plurality of multipliers to a corresponding phase shifter of the second plurality of phase shifters;

for each multiplier of the second plurality of multipliers:
  determining a respective product of the multiplier with the corresponding multiplicand; and
  at the corresponding phase shifter, based on the respective product, imposing a respective phase delay on the third optical input;

before generating the at least one optical interference output, generating a reference signal by splitting the second optical input;

at the second optical coupler, generating at least one second optical interference output by optically coupling the third optical input with the reference signal;

providing the at least one second optical interference output to a second optoelectrical detector; and at the second optoelectrical detector, transducing the at least one second optical interference output into a second electrical output signal associated with a second dot product of the second multiplier vector and the multiplicand vector.

18. The method of claim 17, further comprising, before generating the reference signal, optically coupling the second optical input to a compensation phase shifter, wherein the compensation phase shifter imposes a compensation phase delay on the second optical input.

19. The method of claim 18, further comprising:
  determining information associated with temperature-related phase shifts; and
  selecting the compensation phase delay based on the information.

20. The method of claim 17, wherein:
  the electrical output signal is representative of the dot product; and
  the second electrical output signal is representative of the second dot product.

21. A method for optical computation, comprising:
at a first optical path, receiving a first optical input, wherein:
  the first optical input is coherent;
  the first optical path is optically coupled to a plurality of phase shifters;
  the first optical input propagates along the first optical path, past a plurality of phase accumulators units, to an optical coupler;
for each phase shifter of the plurality of phase shifters:
  receiving a respective electrical input representative of a respective summand; and
  at the phase shifter, based on the respective electrical input, imposing a respective phase delay on the first optical input;
concurrent with receiving the first optical input, at a second optical path, receiving a second optical input, wherein:
  the second optical input is coherent;
  the second optical input propagates along the second optical path to the optical coupler;
at the optical coupler, generating at least one optical interference output by optically coupling the first and second optical inputs;
providing the at least one optical interference output to an optoelectrical detector; and
at the optoelectrical detector, transducing the at least one optical interference output into an electrical output signal associated with a sum of the summands.

* * * * *